US008039826B2

(12) United States Patent
Pearson et al.

(10) Patent No.: US 8,039,826 B2
(45) Date of Patent: Oct. 18, 2011

(54) INSPECTING AN IMPRINTED SUBSTRATE ON A PRINTING PRESS

(75) Inventors: Eric Pearson, Consestogo (CA); Mark R. Hansen, Wauwatosa, WI (US); Bradly S. Moersfelder, Waukesha, WI (US); Patrick James Noffke, Devon Park (AU); John C. Seymour, Genesee Depot, WI (US)

(73) Assignee: Quad/Tech, Inc., Sussex, WI (US)

( * ) Notice: Subject to any disclaimer, the term of this patent is extended or adjusted under 35 U.S.C. 154(b) by 0 days.

(21) Appl. No.: 12/765,723

(22) Filed: Apr. 22, 2010

(65) Prior Publication Data

US 2010/0264338 A1 Oct. 21, 2010

Related U.S. Application Data

(63) Continuation of application No. 12/174,481, filed on Jul. 16, 2008, now Pat. No. 7,732,796, which is a continuation of application No. 10/914,372, filed on Aug. 9, 2004, now Pat. No. 7,423,280.

(51) Int. Cl.
*G01N 21/86* (2006.01)
*G01V 8/00* (2006.01)

(52) U.S. Cl. .................... 250/559.39; 356/429; 358/474

(58) Field of Classification Search ........... 250/559.04–559.07, 559.37–559.44; 356/429, 430, 431; 358/474
See application file for complete search history.

(56) References Cited

U.S. PATENT DOCUMENTS

| | | | |
|---|---|---|---|
| 3,733,018 | A | 5/1973 | Breimayer |
| 3,768,905 | A | 10/1973 | Williams |
| 3,816,722 | A | 6/1974 | Sakoe et al. |
| 3,835,332 | A | 9/1974 | Bridges |
| 3,910,701 | A | 10/1975 | Henderson et al. |
| 4,166,541 | A | 9/1979 | Smith, Jr. |
| 4,197,584 | A | 4/1980 | Blazek |
| 4,366,753 | A | 1/1983 | Glanz et al. |
| 4,425,599 | A | 1/1984 | Rieder et al. |
| 4,488,808 | A | 12/1984 | Kato |
| 4,500,202 | A | 2/1985 | Smyth |
| 4,561,103 | A | 12/1985 | Horiguchi et al. |
| 4,578,810 | A | 3/1986 | MacFarlane et al. |
| 4,675,730 | A | 6/1987 | Adomaitis et al. |
| 4,685,139 | A | 8/1987 | Masuda et al. |
| 4,735,497 | A | 4/1988 | Elterman |
| 4,776,022 | A | 10/1988 | Fox et al. |

(Continued)

FOREIGN PATENT DOCUMENTS

DE 201 08 511 U1 10/2002

(Continued)

OTHER PUBLICATIONS

Anderson et al., "A novel contact image sensor (CIS) module for compact and lightweight full page scanner applications", Dyna Image Corporation, Milpitas CA, USA, SPIE vol. 1901 Cameras, Scanners, and Image Acquisition Systems (1993), pp. 173-181.

(Continued)

*Primary Examiner* — Francis M Legasse, Jr.
(74) *Attorney, Agent, or Firm* — Foley & Lardner LLP

(57) ABSTRACT

A method of inspecting an imprinted substrate on a printing press comprises illuminating a portion of the substrate which has been imprinted with different colors at a plurality of printing units of the printing press. The method further comprises sensing light reflected by the substrate using a contact image sensor to produce data representative of the imprinted substrate, and comparing the data representative of the printed substrate with stored reference data.

21 Claims, 13 Drawing Sheets

U.S. PATENT DOCUMENTS

| | | | |
|---|---|---|---|
| 4,786,819 | A | 11/1988 | Tei |
| 4,797,571 | A | 1/1989 | Ozawa |
| 4,803,734 | A | 2/1989 | Onishi et al. |
| 4,872,024 | A | 10/1989 | Nagai et al. |
| 4,876,585 | A | 10/1989 | Ozawa |
| 4,917,500 | A | 4/1990 | Lugos |
| 4,922,337 | A | 5/1990 | Hunt et al. |
| 4,942,483 | A | 7/1990 | Kinoshita |
| 4,967,233 | A | 10/1990 | Buchar et al. |
| 4,975,972 | A | 12/1990 | Bose et al. |
| 4,998,286 | A | 3/1991 | Tsujiuchi et al. |
| 5,038,048 | A | 8/1991 | Maeda et al. |
| 5,051,776 | A | 9/1991 | Mancino |
| 5,065,440 | A | 11/1991 | Yoshida et al. |
| 5,118,195 | A | 6/1992 | Dobbie |
| 5,144,566 | A | 9/1992 | Anderson et al. |
| 5,148,500 | A | 9/1992 | Belanger |
| 5,232,505 | A | 8/1993 | Novak et al. |
| 5,253,306 | A | 10/1993 | Nishio |
| 5,256,883 | A | 10/1993 | Weichmann et al. |
| 5,278,677 | A | 1/1994 | Lee et al. |
| 5,305,392 | A | 4/1994 | Longest, Jr. et al. |
| 5,317,390 | A | 5/1994 | Bolza-Schunemann et al. |
| 5,329,466 | A | 7/1994 | Monney et al. |
| 5,365,084 | A | 11/1994 | Cochran et al. |
| 5,410,146 | A | 4/1995 | Hur |
| 5,412,577 | A | 5/1995 | Sainio et al. |
| 5,419,547 | A | 5/1995 | Jeong |
| 5,422,954 | A | 6/1995 | Berson |
| 5,426,509 | A | 6/1995 | Peplinski |
| 5,434,629 | A | 7/1995 | Pearson et al. |
| 5,491,384 | A | 2/1996 | Cheng et al. |
| 5,495,347 | A | 2/1996 | Kim |
| 5,528,410 | A | 6/1996 | Cheng |
| 5,548,691 | A | 8/1996 | Sato et al. |
| 5,579,128 | A | 11/1996 | Cheng |
| 5,583,954 | A | 12/1996 | Garakani |
| 5,607,097 | A | 3/1997 | Sato et al. |
| 5,625,703 | A | 4/1997 | Okuda et al. |
| 5,627,911 | A | 5/1997 | Inumaru et al. |
| 5,650,864 | A | 7/1997 | Tseng et al. |
| 5,689,425 | A | 11/1997 | Sainio et al. |
| 5,696,591 | A | 12/1997 | Bilborn et al. |
| 5,724,259 | A | 3/1998 | Seymour et al. |
| 5,724,437 | A | 3/1998 | Bucher et al. |
| 5,757,981 | A | 5/1998 | Kawakubo |
| 5,774,635 | A | 6/1998 | Kuusisto et al. |
| 5,801,851 | A | 9/1998 | Sheng |
| 5,805,307 | A | 9/1998 | Park |
| 5,812,704 | A | 9/1998 | Pearson et al. |
| 5,815,290 | A | 9/1998 | Nam |
| 5,815,594 | A | 9/1998 | Tanaka |
| 5,848,189 | A | 12/1998 | Pearson et al. |
| 5,859,698 | A | 1/1999 | Chau et al. |
| 5,870,204 | A | 2/1999 | Chiu et al. |
| 5,903,365 | A | 5/1999 | Iwata et al. |
| 5,912,988 | A | 6/1999 | Moore |
| 5,940,189 | A | 8/1999 | Matsubara et al. |
| 5,967,049 | A | 10/1999 | Seymour et al. |
| 5,967,050 | A | 10/1999 | Seymour |
| 5,985,690 | A | 11/1999 | Fujikura |
| 6,014,230 | A | 1/2000 | Cheng et al. |
| 6,023,530 | A | 2/2000 | Wilson |
| 6,036,297 | A | 3/2000 | Hayasaki |
| 6,067,379 | A | 5/2000 | Silver |
| 6,072,602 | A | 6/2000 | Sun et al. |
| 6,081,608 | A | 6/2000 | Fujii et al. |
| 6,091,516 | A | 7/2000 | Chang et al. |
| 6,108,461 | A | 8/2000 | Haga |
| 6,111,244 | A | 8/2000 | Wang |
| 6,115,512 | A | 9/2000 | Tsukamoto et al. |
| 6,119,594 | A | 9/2000 | Kipphan et al. |
| 6,128,054 | A | 10/2000 | Schwarzenberger |
| 6,129,817 | A | 10/2000 | Rule, Jr. |
| 6,142,078 | A | 11/2000 | Lachajewski |
| 6,157,453 | A | 12/2000 | Tamanti et al. |
| 6,198,490 | B1 | 3/2001 | Eom et al. |
| 6,198,537 | B1 | 3/2001 | Bokelman et al. |
| 6,263,291 | B1 | 7/2001 | Shakespeare et al. |
| 6,299,730 | B1 | 10/2001 | Broek et al. |
| 6,456,748 | B1 | 9/2002 | Yushiya et al. |
| 6,463,170 | B1 | 10/2002 | Toivonen et al. |
| 6,538,243 | B1 | 3/2003 | Bohn et al. |
| 6,559,956 | B2 | 5/2003 | Proctor |
| 6,603,551 | B2 | 8/2003 | Mestha et al. |
| 6,975,949 | B2 | 12/2005 | Mestha et al. |
| 7,017,492 | B2 | 3/2006 | Seymour |
| 7,072,034 | B2 | 7/2006 | Rosengaus et al. |
| 7,187,502 | B2 | 3/2007 | Gurevich et al. |
| 7,423,280 | B2 | 9/2008 | Pearson et al. |
| 7,732,796 | B2 | 6/2010 | Pearson et al. |
| 2002/0080430 | A1 | 6/2002 | Pilloud |
| 2002/0109112 | A1 | 8/2002 | Guha et al. |
| 2002/0154306 | A1 | 10/2002 | Eisen et al. |
| 2002/0178952 | A1 | 12/2002 | Sainio et al. |
| 2003/0116725 | A1 | 6/2003 | Sorebo et al. |
| 2003/0147101 | A1 | 8/2003 | Wendel |
| 2003/0214683 | A1 | 11/2003 | Fujimoto |
| 2004/0008386 | A1 | 1/2004 | Shiraishi |
| 2004/0066526 | A1 | 4/2004 | Inoo et al. |
| 2004/0119036 | A1 | 6/2004 | Ye et al. |
| 2004/0201669 | A1 | 10/2004 | Guha et al. |
| 2005/0226466 | A1 | 10/2005 | Seymour |
| 2007/0057208 | A1 | 3/2007 | Joss et al. |

FOREIGN PATENT DOCUMENTS

| | | | |
|---|---|---|---|
| DE | 101 24 943 | | 12/2002 |
| DE | 201 05 840 | U1 | 12/2002 |
| EP | 0289084 | | 11/1988 |
| EP | 0289206 | | 11/1988 |
| EP | 0403082 | | 12/1990 |
| EP | 0699132 | B1 | 9/1998 |
| EP | 1551635 | B1 | 6/2009 |
| JP | 19990039764 | | 8/2000 |
| WO | WO 96/05502 | | 8/1995 |
| WO | WO 2006/046249 | | 5/2006 |

OTHER PUBLICATIONS

Citation to Photodetectors for picosecond spectroscopy, 1 page, 1984.

CMOS Sensor Inc.; brochure; at least as early s Jan. 1, 2004; 7 pages; M106-A6-R1(8 dpm Contact Image Sensor (CIS) module; Cupertino, CA.

Edmund Optics, Fiber Optic Image Conduits, printed from Internet address: http://www.edmundoptics.com/onlinecatalog/displayproduct.cfm?productID=1355&search=1 on Jan. 24, 2008, 4 pages.

Edmund Optics, Fiber Optic Tapers and Faceplates, printed from Internet address: http://www.edmundoptics.com/onlinecatalog/displayproduct.cfm?productID=1599&search=1 on Jan. 24, 2008, 4 pages.

European Patent Application Publication No. 0289084A3, search completed Jun. 6, 1990, 2 pages.

European Patent Application Publication No. 0403082A3, search completed Apr. 8, 1991, 2 pages.

Extended European Search Report including Annex to the European Search Report and European Search Opinion for European application EP 05254936, completion date Oct. 27, 2005, 12 pages.

Hembd-Sölner, C., Imaging Properties of the Gabor Superlens, Part of the 18th Congress of the International Commission for Optics: Optics for the Next Millennium, San Francisco, California, Aug. 1999 SPIE vol. 3749, 2 pages.

Janesick, J. et al., Developments and Applications of High-Performance CCD and CMOS Imaging Arrays, Annu. Rev. Nucl. Part. Sci. 2003. 53:263-300, doi: 10.1146/annurev.nucl.53.041002.110431, copyright © 2003 by Annual Reviews, 39 pages.

Janesick, J., Dueling Detectors, Spie's oeMagazine, Feb. 2002, reference: Jim Janesick, Proc. SPIE vol. 4669A, paper #45, San Jose, CA (2002), 4 pages.

Litwiller, D., CCD vs. CMOS: Facts and Fiction, reprinted from the Jan. 2001 issue of Photonics Spectra © Laurin Publishing Co. Inc., 4 pages.

Notice of Allowance for U.S. Appl. No. 12/174,481, mail date Feb. 22, 2010, 9 pages.
Office Action for U.S. Appl. No. 12/174,481, mail date Aug. 21, 2009, 14 pages.
P13034A 200DPI CIS Sensor Chip Engineering Data Sheet; 7 pages; San Jose, CA, Jun. 15, 2003.
Perger, A., et al., Optical and Quantum Electronics, Short Communication, vol. 16, No. 1, Chapman and Hall Ltd., Jan. 1984, 4 pages.
Peripheral Imaging Corporation, PI3020 200DPI CIS Image Sensor Engineering Data Sheet, dated Feb. 1, 2001, 7 pages.
Peripheral Imaging Corporation, P1223MC-A6 CIS Module 200DPI CIS Sensor Engineering Data Sheet, dated May 24, 2000, 5 pages.
Peripheral Imaging Corporation, P1225MC-A6 CIS Module 200DPI CIS Sensor Engineering Data Sheet, dated Aug. 25, 2000, 6 pages.
Texas Advanced Optoelectronic Solutions, Intelligent Opto Sensor, Designer's Notebook, No. 2, SELFOC® Lens Arrays for Line Scanning Applications, Revision B Contributed by NSG America, Inc., 5 pages, Apr. 1, 2004.
Tichawa Vision GmbH, printed at Internet address: http://www.tichawa.de/index1.html on Nov. 5, 2003, 1 page.
Tichawa Vision GmbH, printed at Internet address: http://www.tichawa.de/vision.html on Nov. 5, 2003, 1 page.
Tichawa Vision GmbH, printed at Internet address: http://www.tichawa.de/cis.html on Nov. 5, 2003, 1 page.
Tichawa Vision GmbH, printed at Internet address: http:/www.tichawa.de/spec__cis.html on Nov. 5, 2003, 1 page.
Tichawa Vision GmbH, Industrial Contact Image Sensors TiVi CIS-X, 1 page, Nov. 5, 2003.
Tichawa Vision GmbH, Tichawa Vision Monochrome High Speed Contact Image Sensors—Specifications, 1 page, Nov. 5, 2003.
Tichawa Vision GmbH, printed at Internet address: http://www.tichawa,,de/cis__technologie.html on Nov. 5, 2003, 1 page.
Wintriss Engineering Corporation, printed at Internet address: http://www.weco.com on Oct. 30, 2003, 1 page.
Wintriss Engineering Corporation, Web Inspection, Machine Vision Cameras, Lighting & Interface Boards, printed at Internet address: http://www.weco.com/products.html on Oct. 30, 2003, 1 page.
Wintriss Engineering Corporation, Press Releases, News and Events, printed at Internet address: http://www.weco.com/news.html on Oct. 30, 2003, 2 pages.
Wintriss Engineering Corporation, Low Contrast Web Ranger 2000 Inspection System, 2 pages, 2000.
Wintress Engineering Corporation, High Contrast Web Ranger 1000 Inspection System, 2 pages, 2000.
U.S. Department of Commerce, National Technical Information Service, 1984 Annual Meeting of the Austrian Physical Society, Montanistic University Leoben, Sep. 24-28, 1984, p. 111, including Dictionary.com/Translator, 3 pages.

10
12
14
16
18
20
22
24
26
28
30
32
34
36
38
40
42
44

INSPECTING AN IMPRINTED SUBSTRATE ON A PRINTING PRESS

CROSS-REFERENCE TO RELATED APPLICATIONS

This application is a continuation of U.S. application Ser. No. 12/174,481 filed Jul. 16, 2008, which is a continuation of U.S. application Ser. No. 10/914,372 filed Aug. 9, 2004, both of which are herein incorporated by reference in their entireties.

FIELD OF THE INVENTION

The present invention relates generally to a web inspection module for a printing press, and more particularly, to a web inspection module including a plurality of contact image sensors for obtaining image data from an imprinted web moving at a high rate of speed.

BACKGROUND OF THE INVENTION

In an exemplary printing press such as a web offset press, a web of material, typically paper, is fed from a storage mechanism, such as a reel stand, to one or more printing units that repetitively imprint the web with images. The imprinted web is typically driven through a number of processing units such as a dryer unit, a chill stand, and possibly a coating machine. The web is then typically fed to a former/folder to be slit, folded, and cut into multipage signatures.

It is desirable to monitor the quality of the imprinted web, to ensure that the amount of applied ink is appropriate and produces the desired optical characteristics, and to ensure that the different ink colors are properly aligned (registered) with respect to one another. Further, monitoring the web is important to ensure that the imprinted web does not include defects such as ink blots, lack of ink in areas where ink should be, smears, streaks, or the like, and to insure that various print processes occur at a correct location with respect to the ink on the web. For example, ink color control systems, color registration systems, and defect detection systems are known systems used in connection with monitoring the quality of the imprinted web. Various other types of control systems are also known for controlling the position of the web with respect to a processing unit of the printing press. For example, a cutoff control system operates to control the longitudinal position of the web so that the cutting of the web into signatures occurs at a desired location.

Such systems generally include an imaging assembly for obtaining image data from a portion of the moving imprinted web. Typically, the acquired image data is compared to reference image data. The resultant information is used, for example, to control the amount of ink applied to the web, the alignment of the printing plates with respect to each other, to mark or track the whereabouts of resultant defective printed product, or to control the location of the imprinted web with respect to a processing unit.

More specifically, in a typical ink color control system for controlling the amount of ink applied on a printing press, the camera collects image data representative of color patches printed on the web. These patches generally extend across the width of the web. Pixels of the color patch image data are then processed, and assigned a color value that is compared against a desired color value. If the absolute difference between the desired color value and the determined color value for a number of pixels in an ink key zone is outside a predetermined tolerance, an associated ink key is then controllably adjusted to effect a change in the ink flow rate. Markless color control systems are also known that do not require the use of separate color patches but instead measure color values in the desired graphical/textual printed work itself. Examples of ink color control systems are described in U.S. Pat. Nos. 5,967,049 and 6,318,260.

A typical defect detection system also acquires an image of the imprinted web. The acquired image is subsequently compared to a stored digital template image. Any discrepancy between the acquired image and the template image beyond some tolerance is considered to be a defect. The defects are then logged in a data file, and can be categorized as isolated defects or non-isolated defects. Non-isolated defects occur when the system detects a change in color due to a change in inking level over a large portion of the web. When non-isolated defects are reported, an alarm will subsequently be set off to alert an operator to take appropriate corrective action. Isolated defects can be tracked such that the associated printed products are marked as defective, or are otherwise separated from the acceptable printed products.

Typically, color registration systems also compare acquired image data to reference image data and adjust the registration or alignment of each ink color with respect to the others by adjusting the positions of the printing plates with respect to each other. Color registration systems using marks or patches are known, as are markless systems. Examples of such systems are described in U.S. Pat. Nos. 5,412,577 and 5,689,425.

These control systems all require image data to be acquired from the printed work on the web, and vary in the amount and resolution of data required. For example, to detect defects in the entire printed work, it is desirable to acquire image data for the entire width of the web, as well as the entire length of the web. An ink key control system, because it controls ink keys across the lateral extent of the web, would preferably obtain image data from patches (or the desired printed work itself) across the entire width of the web, but only once per image repeat. Similarly, a color registration system using color marks would obtain image data only once per image repeat. Additionally, marks for color registration or cutoff control generally do not extend across the web.

Typical imaging assemblies include lighting elements for illuminating the web, and a camera having sensors for sensing light and optical elements for focusing light reflected from the imprinted web to the sensors. Known sensors include area array sensors having two-dimensional arrays of sensing elements, and line scan sensors, which include a single line of sensing elements aligned across the web. With line scan sensors, two dimensional image data is obtained by acquiring successive lines of data as the imprinted web moves with respect to the line sensors.

Typical optical elements are lenses that reduce the image on the web in order to obtain a desired resolution for the image data. This typically results in a field of view for the camera that is several inches in width. With such prior art imaging assemblies, the distance between the web and the camera generally needs to be comparable to the width of the web being imaged. Thus, prior art imaging assemblies for printing presses generally require a distance on the order of approximately four feet between the web and the camera. Further, because the cameras themselves were often expensive, prior art systems typically minimized costs by using a single camera with a positioning unit to move the imaging assembly across the width of the web.

SUMMARY

A method of inspecting an imprinted substrate on a printing press comprises illuminating a portion of the substrate which has been imprinted with different colors at a plurality of printing units of the printing press. The method further comprises sensing light reflected by the substrate using a contact image sensor to produce data representative of the imprinted substrate, and comparing the data representative of the printed substrate with stored reference data.

Other features and advantages of the invention will become apparent by consideration of the detailed description and accompanying drawings.

BRIEF DESCRIPTION OF THE DRAWINGS

FIG. 5(*b*) is a perspective view of a web inspection system and further illustrating light sources for two of the web inspection modules;

FIG. 5(*c*) is a front view of the web inspection system illustrated in FIG. 5(*b*) and showing the components within the light source housing;

FIG. 5(*d*) is a top view of the web inspection system illustrated in FIG. 5(*b*);

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

DETAILED DESCRIPTION OF THE PREFERRED EMBODIMENTS

Figure 1:
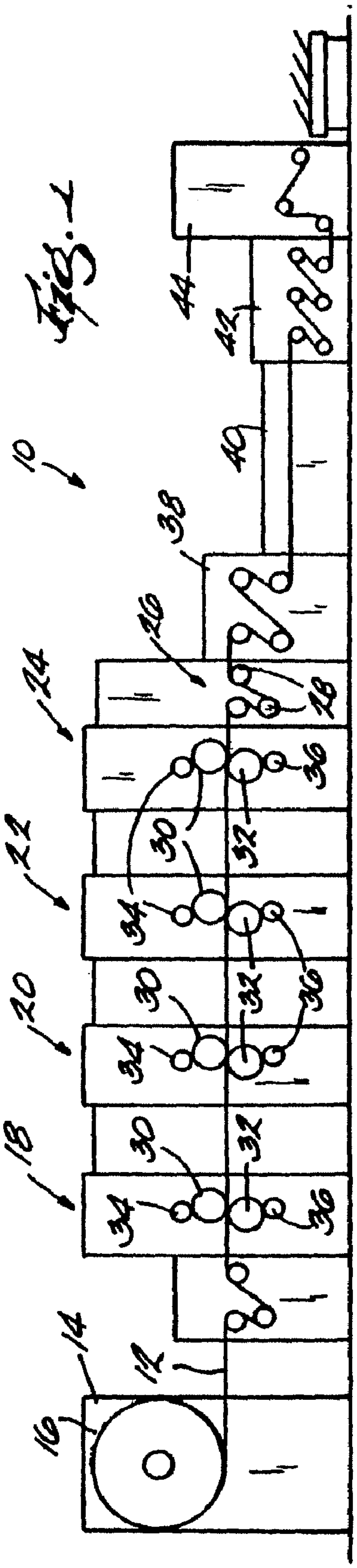
FIG. 1 is a schematic diagram of a typical printing press.

FIG. 1 illustrates a representative printing press 10 for repetitively printing desired images upon a substrate such as a paper web. The printing press 10 illustrated is a web offset press and includes a reel stand 14 that supports a reel 16 of the web 12. It should be noted that the invention is equally applicable to sheet fed presses and other non-offset presses such as gravure presses and newspaper presses for example.

The printing press 10 includes printing units 18, 20, 22, and 24, each of which prints using a different color ink. For example, in the illustrated printing press 10, the first printing unit 18 encountered by the web 12 prints with black ink and the other printing units 20, 22 and 24 respectively print with magenta ink, cyan ink, and yellow ink. It should be understood, however, that the invention is capable of being carried out with printing units that print in different colors, and/or with fewer or additional printing units. The printing press 10 includes a drive system 26, including drive rollers 28 that move the web 12 from the reel 16 through each of the printing units 18, 20, 22, and 24.

Each printing unit 18, 20, 22, and 24 includes a pair of parallel rotatable blanket cylinders 30 and 32 that nip the web 12. Each printing unit 18, 20, 22, and 24 further includes a plate cylinder 34 which has a printing plate thereon, and which applies an ink image to the blanket cylinder 30. The images printed by each of the printing units 18, 20, 22 and 24 overlap to create composite multi-color images on the traveling web 12. Optionally, if it is desired to print on both sides of the web 12, each printing unit 18, 20, 22, and 24 will also include a plate cylinder 36 having a printing plate thereon for applying an ink image to the blanket cylinder 32. The blanket cylinders 30 and 32 transfer the ink images, received from the plate cylinders 34 and 36, to the web 12.

After exiting the printing stations 18, 20, 22, and 24, the now imprinted web 12 is guided through various processing units, such as a tensioner 38, a dryer 40, and a chill stand 42. The imprinted web is then fed to a former/folder 44.

Figure 6:
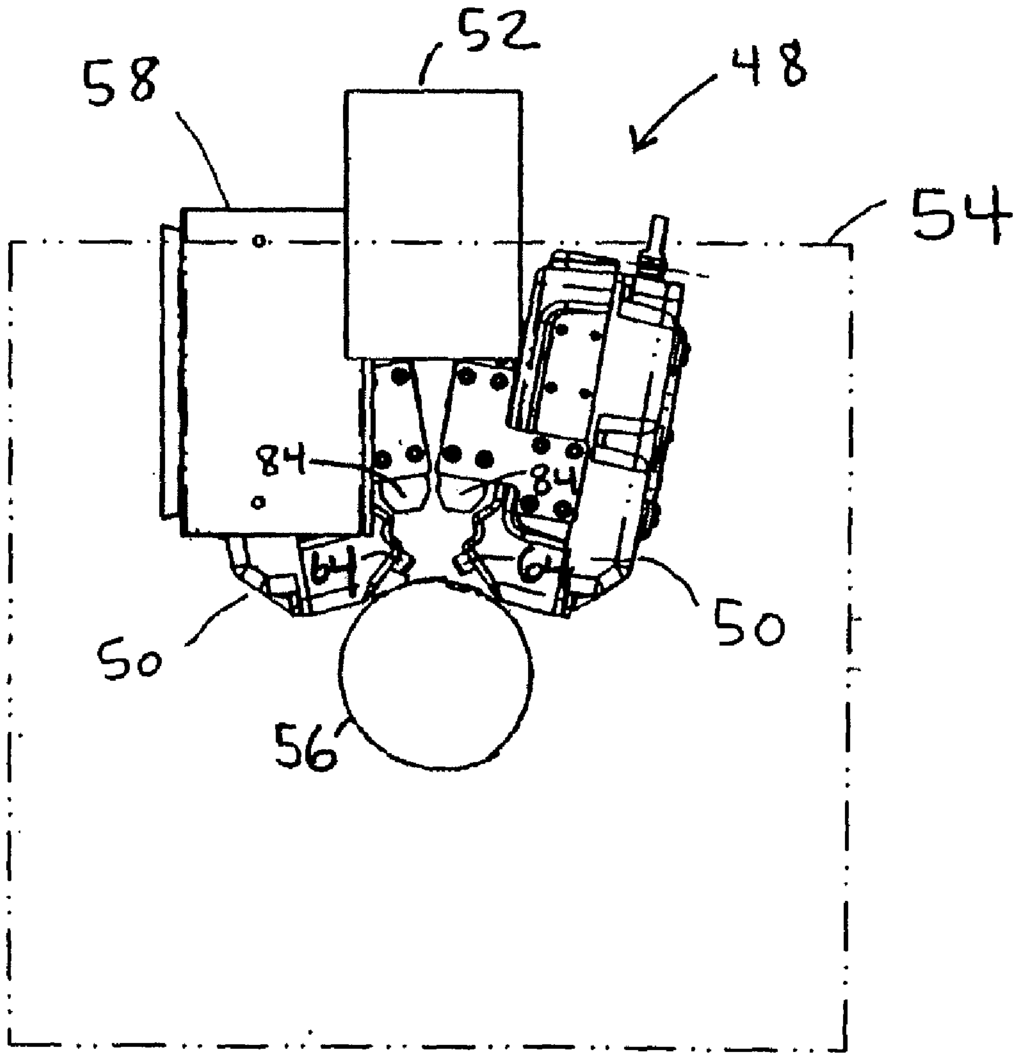
FIG. 6 is a side view of the web inspection system illustrated in FIG. 5(*a*) including the web inspection modules.

As shown in FIGS. 5(*a*)-5(*d*), a web inspection system 48 includes a plurality of web inspection modules 50 for scanning the web 12 to produce image data representative of the imprinted web. In particular, FIG. 5(*a*) is a perspective view of a web inspection system according to one embodiment. A longitudinal direction 46 is defined as the direction of web travel, with a lateral direction 47 substantially perpendicular to the longitudinal direction 46. FIG. 6 is a side view of the web inspection system shown in FIG. 5(*a*).

Although the web inspection system 48 can be mounted at any convenient location on the printing press 10, in one embodiment, the web inspection modules 50 are mounted to a mounting bar 52 that is mounted to side plates 54 of an idler roller 56 such as at the chill stand 42. In this manner, the web 12 is stabilized on the surface of the idler roller 56 when the imprinted web is scanned and the system 48 is readily incorporated on an existing printing press. The web inspection system 48 also includes a distribution box 58 having, for example, an Ethernet hub for coupling signals to and from each web inspection module 50 to a central processing unit of the press (not shown). The web inspection system 48 is low profile and is located in close proximity to the web 12.

In the preferred embodiment, a single web inspection module 50 is designed to include a contact image sensor 66 (one embodiment shown in FIG. 7) to acquire image signals corresponding to approximately 12.4 inches across the web, i.e., in the lateral direction. Thus, four web inspection modules 50 can be used to acquire data across the entire width of a 48 inch web, with the web inspection modules being aligned such that their contact image sensors 66 slightly overlap in the lateral direction. In one embodiment, this overlap is on the order of 0.1 inch. The web inspection system 48 can also be designed in order to take into account web weave, i.e., the lateral movement of the web itself, which in some presses can be on the order of two inches or so. In such a case, the web inspection system 48 can include contact image sensors 66 that image an area having a width that is greater than the width of the web by the amount of expected lateral web weave. Each module 50 essentially provides image signals for a longitudinally extending slice of the imprinted web. Using multiple modules 50 allow image signals corresponding to the entire width of the web to be obtained.

Figure 2:
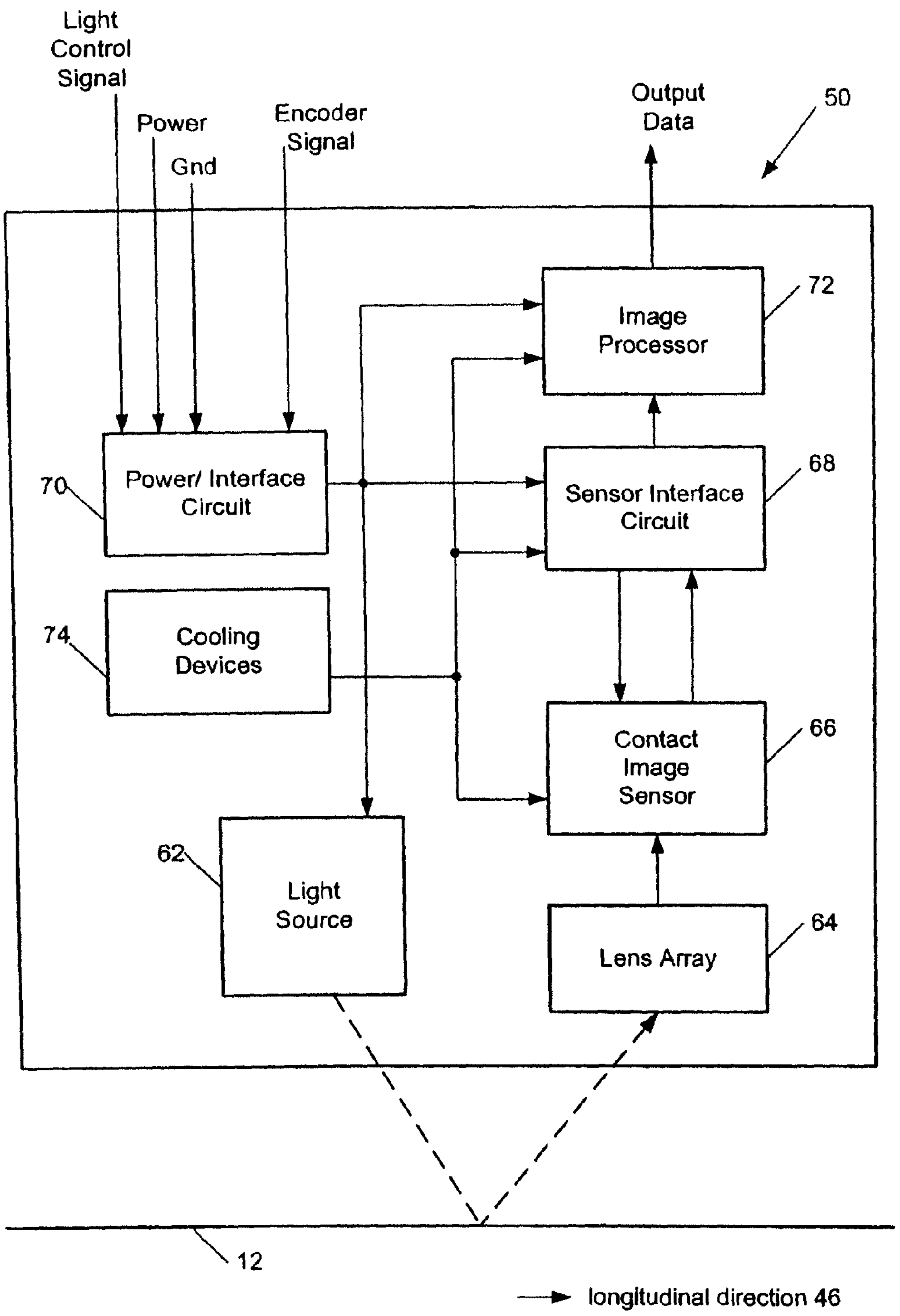
FIG. 2 is a block diagram of a web inspection module.

FIG. 2 schematically illustrates in block diagram form one embodiment of a web inspection module 50 in accordance with the invention. The web inspection module 50 includes components such as a light source 62, a lens array 64, a contact image sensor 66, a sensor interface circuit 68, a power/interface circuit 70, an image processor 72, and cooling devices 74. The web inspection module 50 is operable to scan at least a portion of an imprinted web moving in the longitudinal direction 46 in a printing press. Each web inspection module 50 receives from the distribution box 58 a plurality of signals including an encoder signal (as is known in the art), power and ground signals, and optionally, a light control signal. In particular, the power/interface circuit 70 receives these signals, buffers them as necessary, and supplies appropriate signals to several of the other components. As more fully explained below, the light source 62 provides light to illuminate a portion of the web. Reflected light from the web passes through the lens array 64 and is measured by a contact image sensor 66 having a plurality of sensing elements 67 (one embodiment shown in FIG. 7) to generate image signals. The sensor interface circuit 68 receives the image signals from the sensing elements 67, performs analog to digital conversion of the signals, and processes the digital image signals to produce image data that is then sent to the image processor 72. The image data is representative of the imprinted web and may represent color information or monochromatic information, as explained below. The cooling devices 74 operate to cool the contact image sensor 66 and several other circuit components in order to allow the contact image sensors to operate at an appropriate clock rate to provide image signals at a desired longitudinal resolution. The image processor 72 performs calculations and operations using the image data according to a desired application, such as a defect detection application, color registration application, or the like. Output data from the image processor 72 is then transmitted to the distribution box 58 to be transferred to a central processing unit of the press.

Figure 3B:
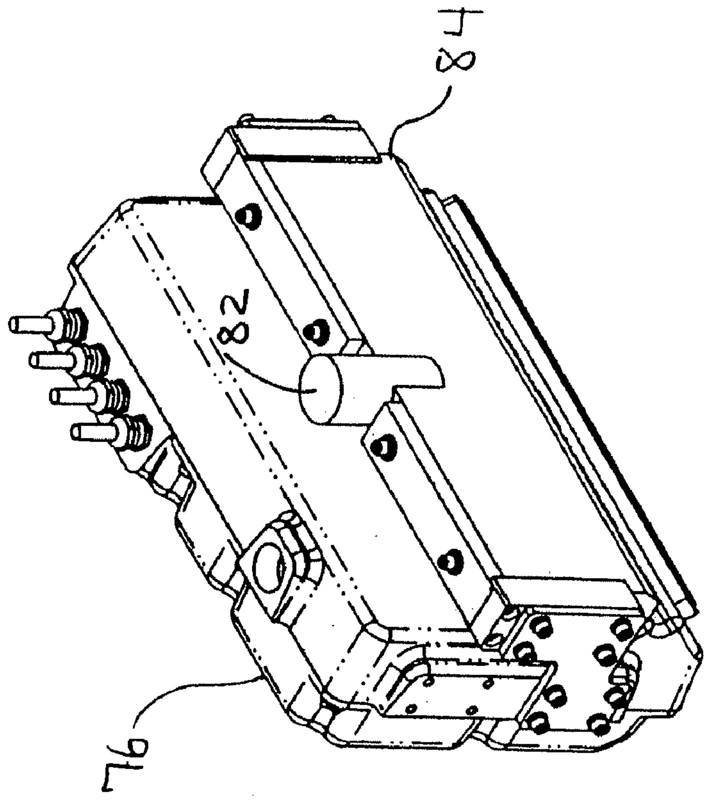
FIGS. 3(*a*)-3(*b*) are perspective views of a web inspection module according to one embodiment.
Figure 3A:
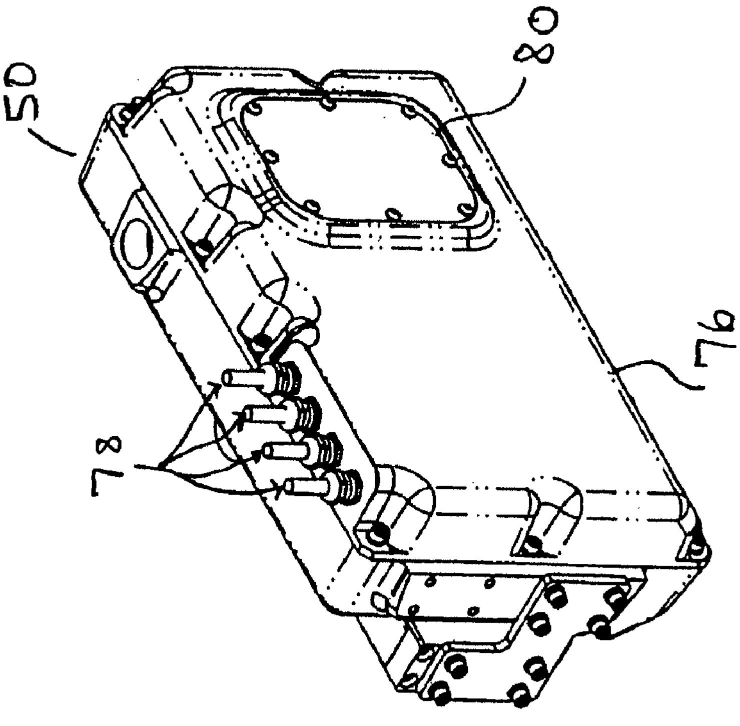
Figure 4A:
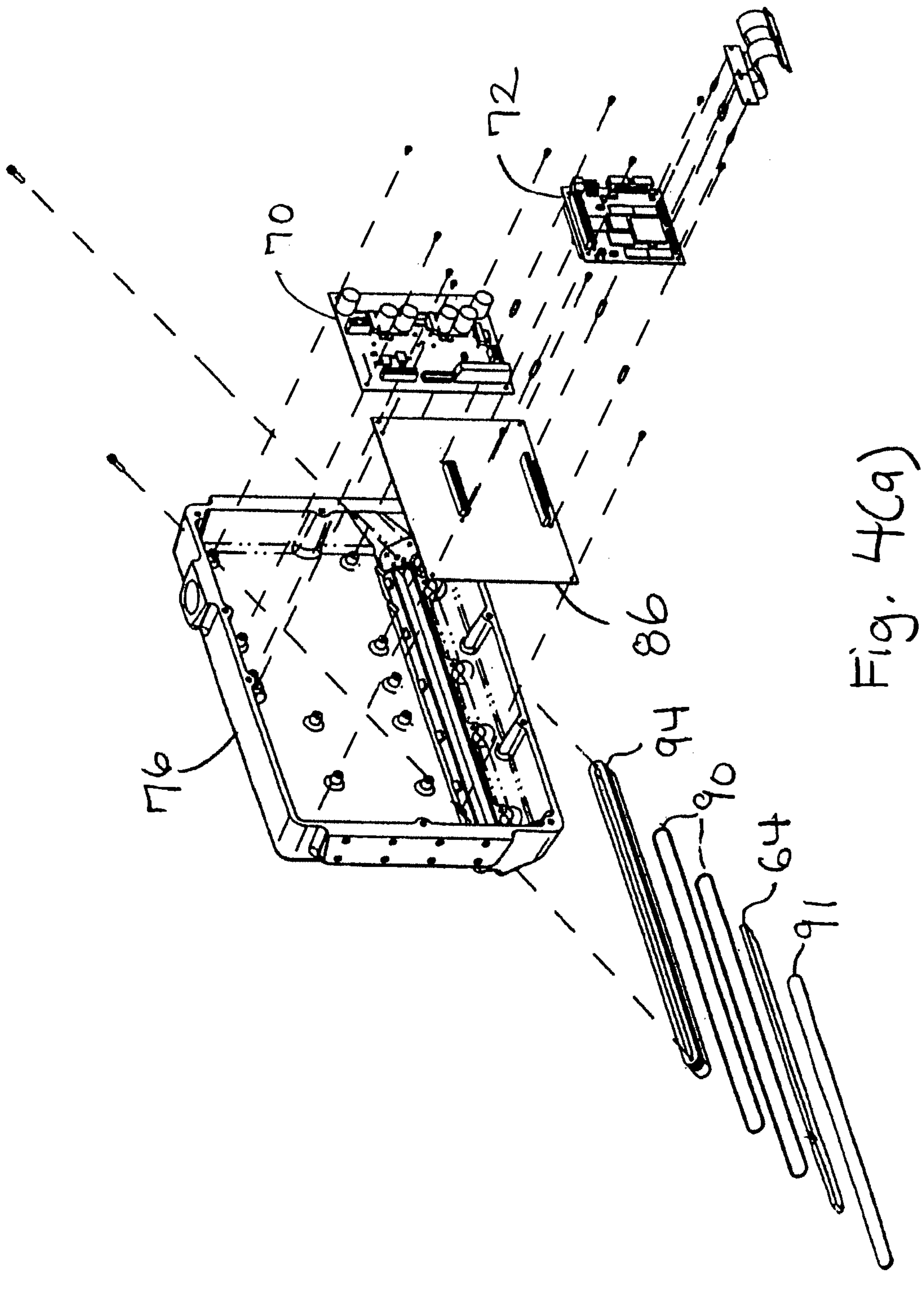
FIGS. 4(*a*)-4(*e*) are exploded views of a web inspection module illustrating the various components and their arrangement according to one embodiment.
Figure 4B:
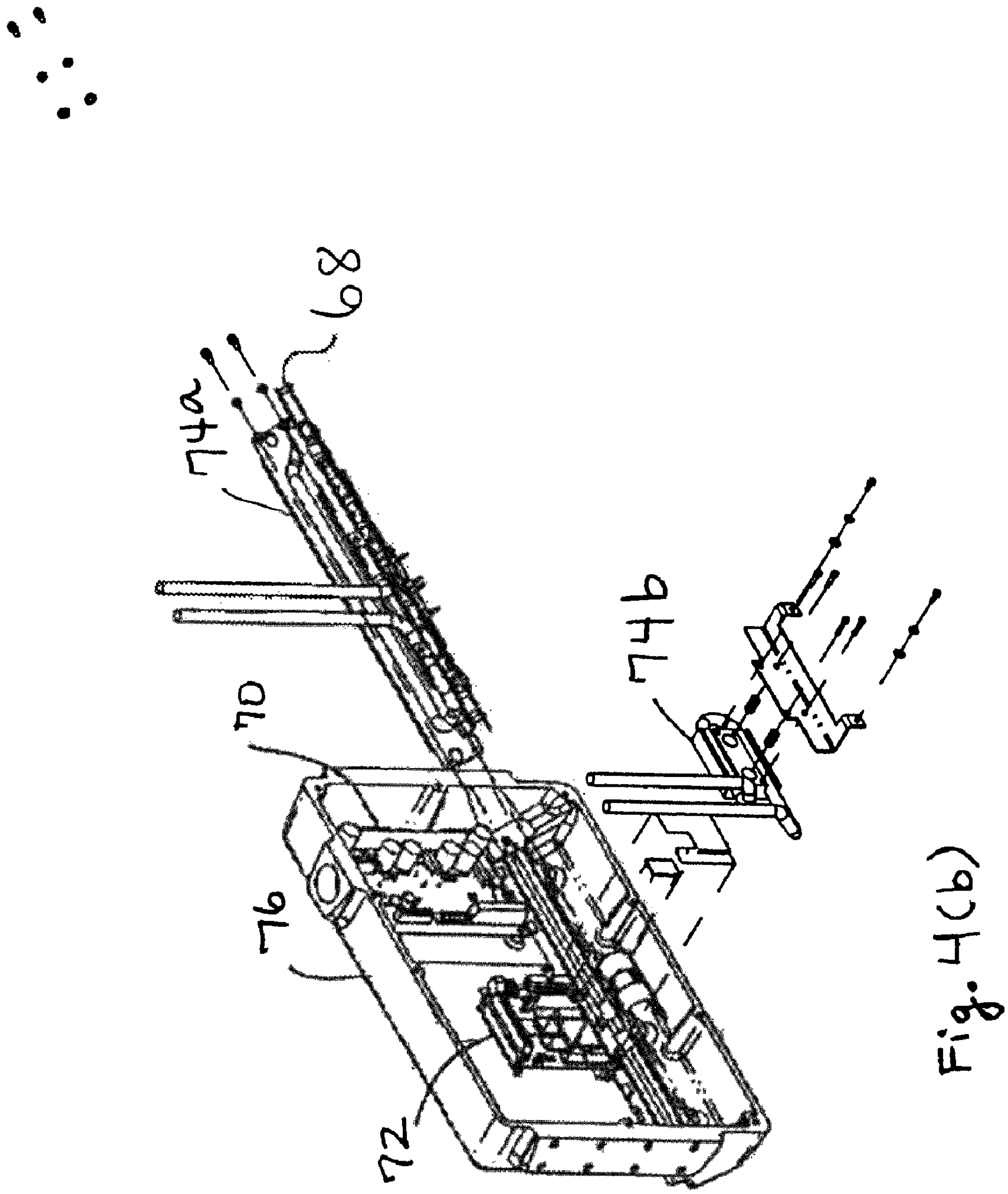
Figure 4C:
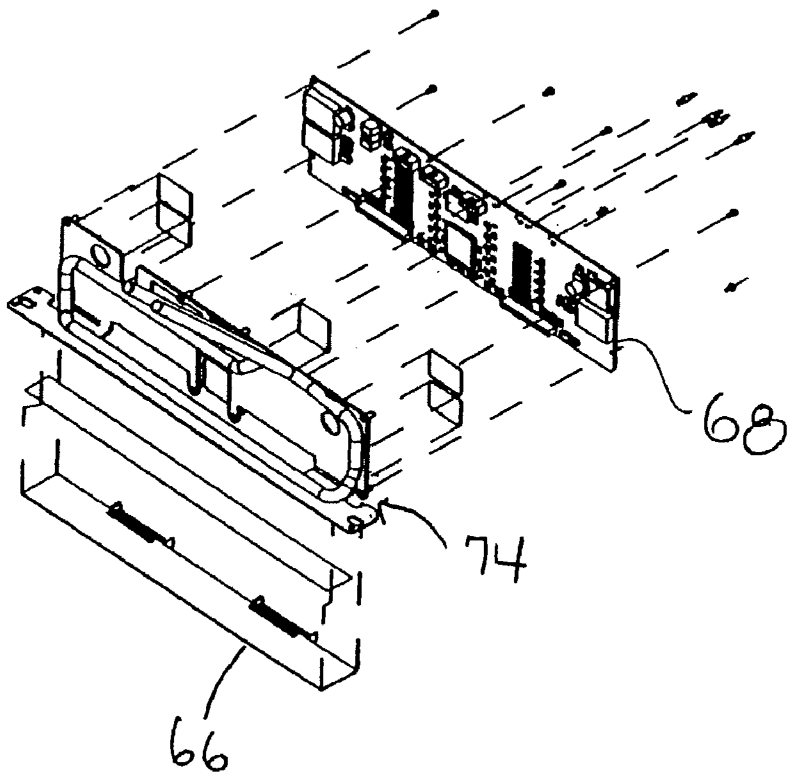
Figure 4D:
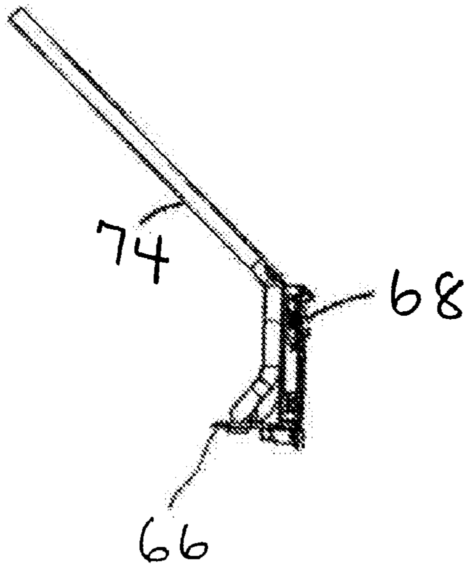
Figure 4E:
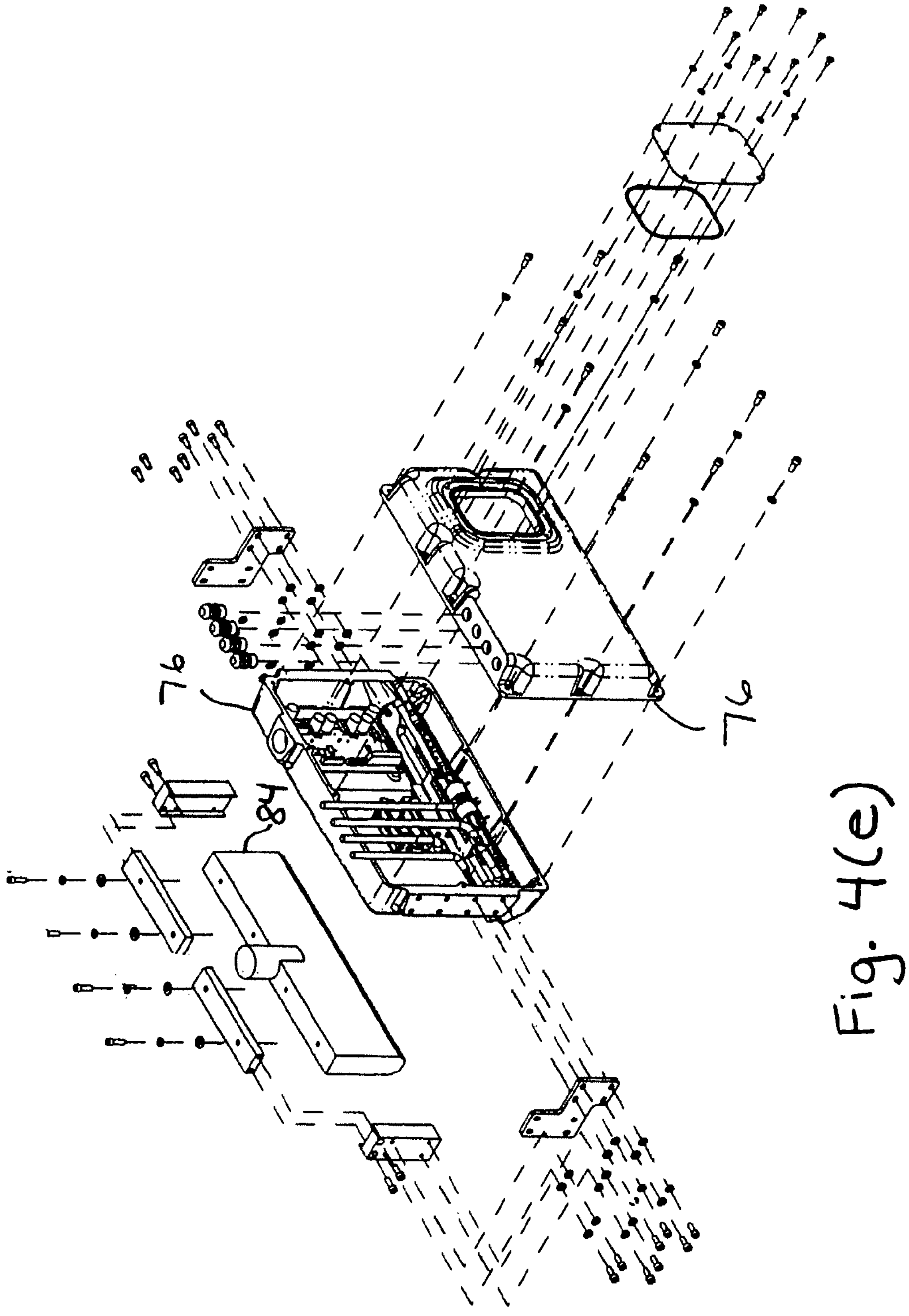
Figure 5A:
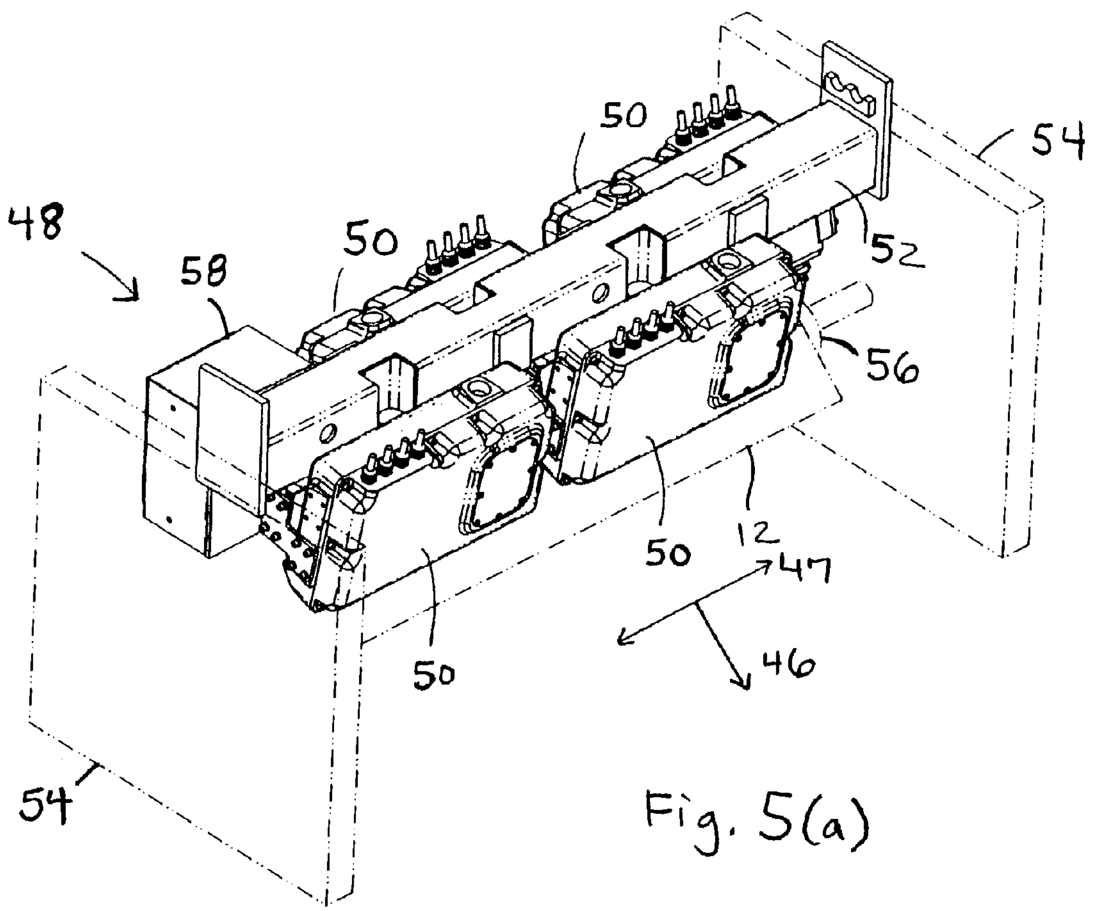
FIG. 5(*a*) is a perspective view of a web inspection system according to one embodiment.
Figure 5B:
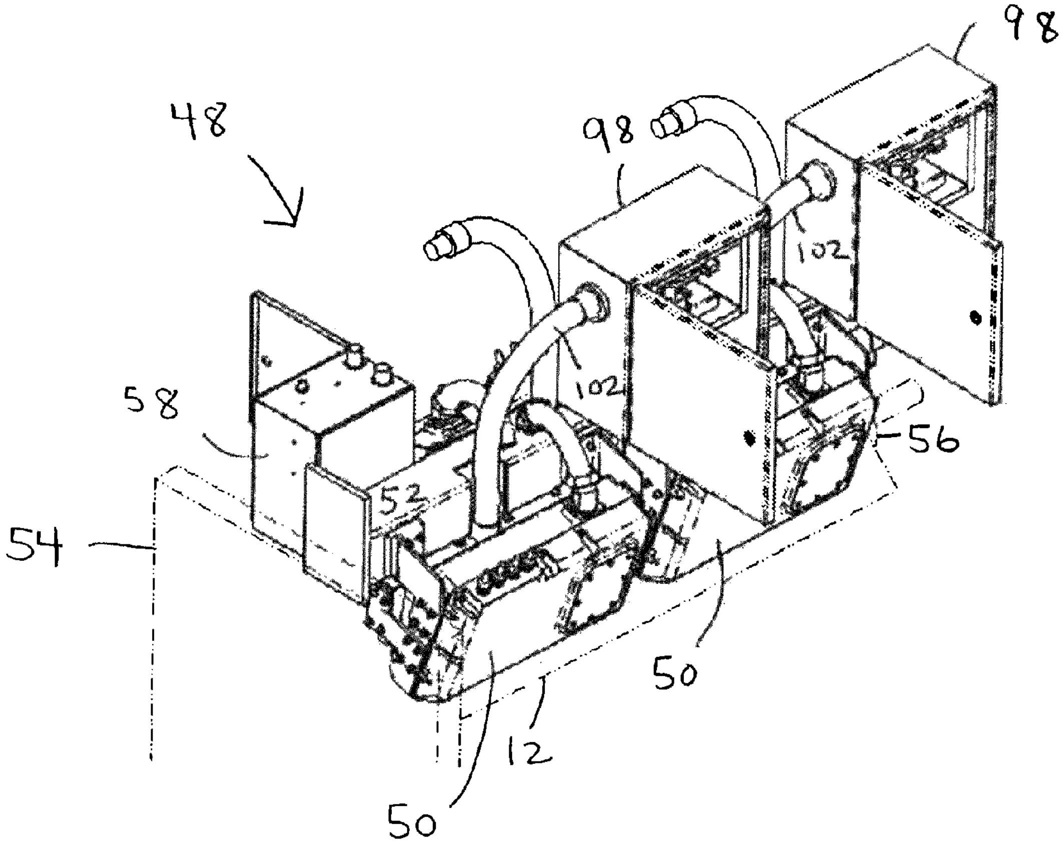
Figure 5C:
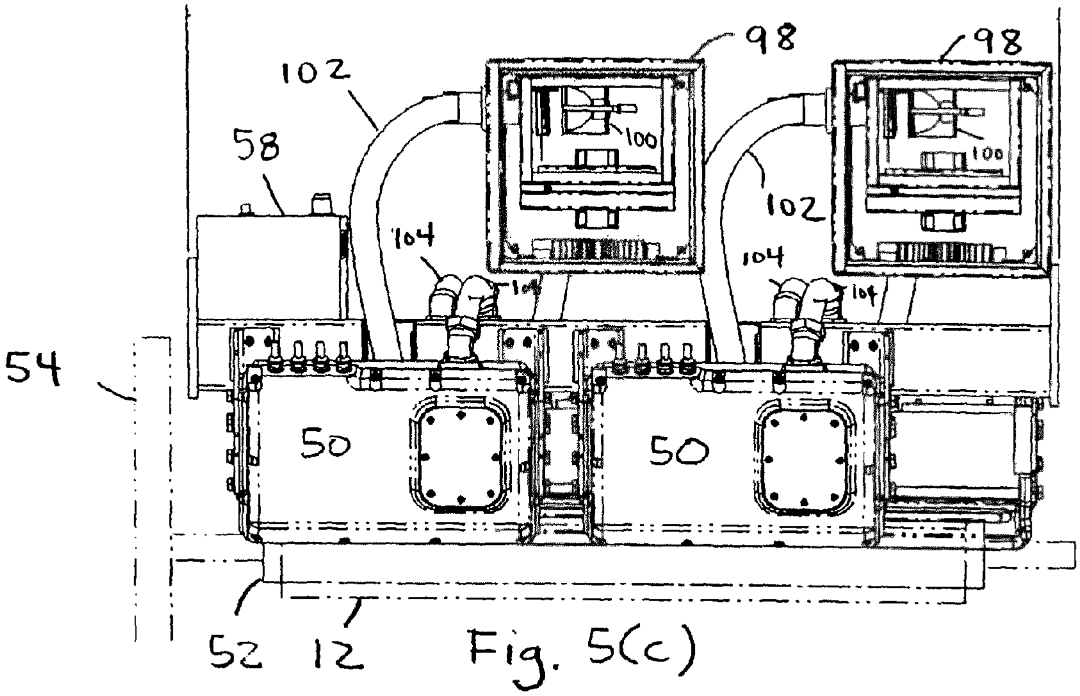
Figure 5D:
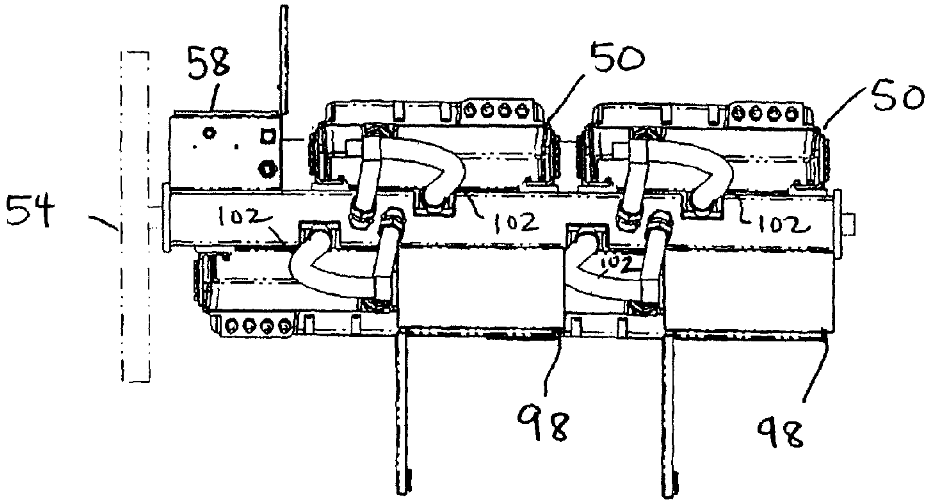

FIGS. 3(*a*) and 3(*b*) illustrate perspective views of a web inspection module 50 according to one embodiment. This web inspection module 50 includes a compact housing 76, having dimensions on the order of sixteen inches wide, ten inches high, and a depth of five inches. The housing 76 provides protection for several of the module components. FIG. 3(*a*) also illustrates the input ports 78 for chilled water for the cooling devices 74, and also an access panel 80 for easy access to the components inside the housing 76, and in particular to the power/interface circuit 70. FIG. 3(*b*) illustrates one embodiment of an input light port 82 and light distributor 84 for receiving light from the light source and distributing light to a portion of the web.

FIGS. 4(*a*)-4(*e*) are exploded views that illustrate the physical arrangement of several of the module components within the housing 76. In particular, FIG. 4(*a*) shows the power/interface circuit 70, and the image processor 72 coupled to a network board 86 providing connections, such as Ethernet connections, to the distribution box 58. FIG. 4(*a*) also illustrates the placement of a lens array 64 and lens array housing 94, and various sealing elements 90. The lens array 64 couples light reflected from the imprinted web to the contact image sensor 66, in one embodiment, through a transparent protector 91.

FIGS. 4(*c*) and 4(*d*) illustrate the contact image sensor 66 and the sensor interface circuit 68 arranged substantially perpendicular to each other. A cooling device 74*a* in the form of tubes with chilled water operates to cool the sensor 66 and sensor interface circuit 68. FIG. 4(*b*) shows the placement of cooling device 74*b* for cooling the image processor 72. In one embodiment, the cooling devices 74*a*, 74*b* are connected to the water supply of the chill unit 42. Such chill units are typically part of a web offset printing press. The cooling devices 74*a*, 74*b* operate to keep the components within a specified operating temperature range, for example, at a temperature below 55 degrees centigrade.

FIG. 4(*e*) further illustrates the light distributor 84, such as a fiber optic bundle, for transmission and distribution of the light from the light source 62 to a desired portion of the web. The desired web portion has a dimension measured in the lateral direction at least equal to the length of the sensing elements 67 (note that the length of the sensing elements 67 is also measured in the lateral direction). The light source 62 can be, for example, an AC or a DC light bulb. Using such an optical distributor, the AC or DC light bulb can be located on top of the housing and the light from the bulb transmitted to the desired portion of the web. Referring to FIGS. 5(*b*)-5(*d*), illustrated therein is a light source box 98 for housing the light source 62, such as a light bulb 100. Although only two boxes 98 are illustrated, in this embodiment, each web inspection module 50 would have its own light source box and bulb. Also illustrated is a light tube 102 for transmitting light from the light source box 98 to light distributor 84 via port 82 (both shown in FIG. 3(*b*)). Further illustrated are connections 104 between the web inspection modules 50 and the distribution box 58, which are routed via the mounting bar 52. FIG. 5(*d*) is a top view of the web inspection system illustrated in FIG. 5(*b*).

In the preferred embodiment, the AC or DC light sources are non-strobed such that light is continuously provided while the imprinted web is being scanned. Each web inspection module acquires a single line of data at a time, with the movement of the web providing additional lines over time. Thus, for each web inspection module 50, image signals are obtained for the entire longitudinal extent of each repeat of the desired image on the web, for that portion of the web width scanned by that particular module 50. Thus, the web inspection system can provide 100% coverage of the web 12.

The lifespan and cost of the light source 62 are considerations in the design of the web inspection module 50, with AC light bulbs typically being cheaper and lasting longer than DC light bulbs. Alternatively, a line array of LEDs can be used as the light source 62 for illuminating a portion of the imprinted web. In such a case, the LEDs can be arranged along the width of the web inspection module such that an optical distributor is not necessary. Preferably, LEDs emitting white light are employed, although other LEDs such as those emitting red, blue or green light can be used, depending upon the sensors used and the type of image data required for the application. The LEDs provide the option of pulsed operation.

Preferably, light is delivered to the web (directly or indirectly from a light source 62) at an angle of approximately 45 degrees from the reflected light travelling to the lens array 64. The use of LEDs as a light source may require the use of reflectors to focus the emitted light in an advantageous manner.

The power/interface circuit 70 includes the necessary components to supply appropriate power and ground signals to the other components of the web inspection module.

Figure 7:
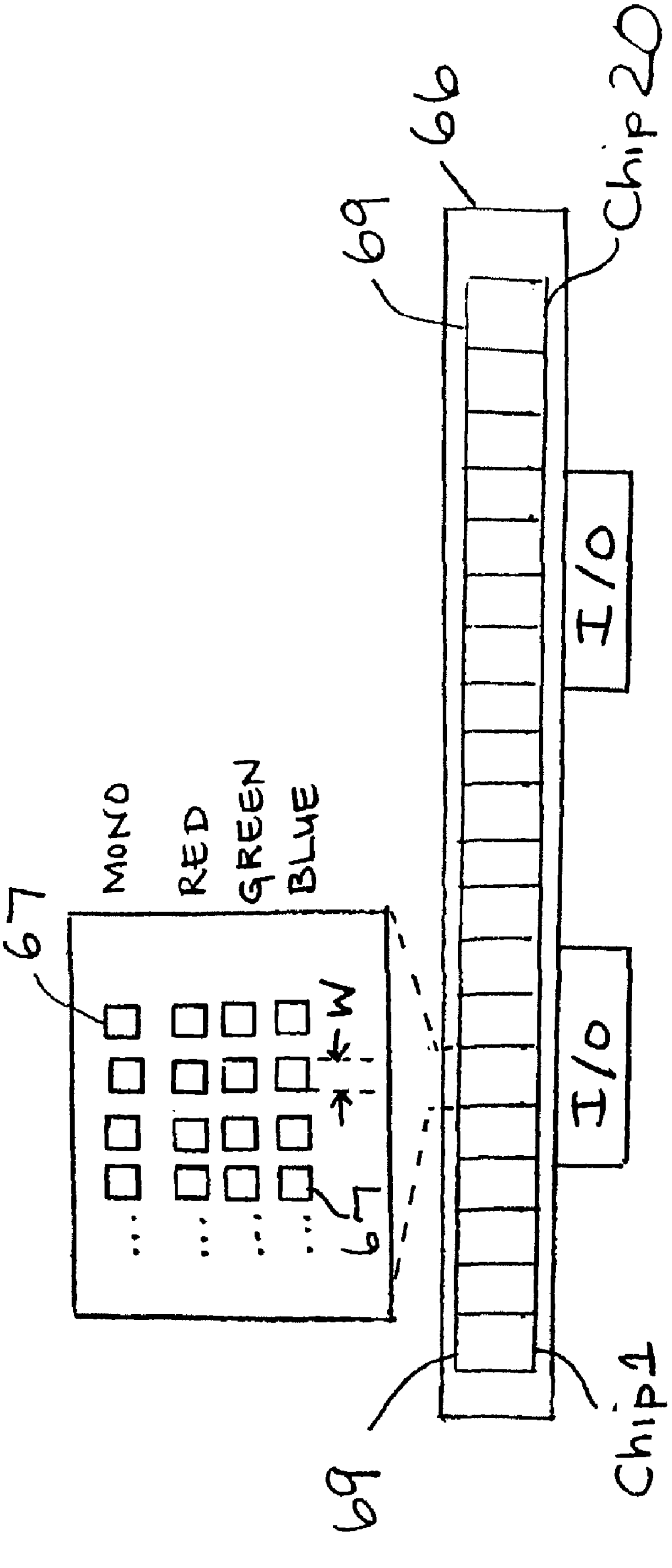
FIG. 7 is a schematic of a contact image sensor in the form of a sensor board.
Figure 8:
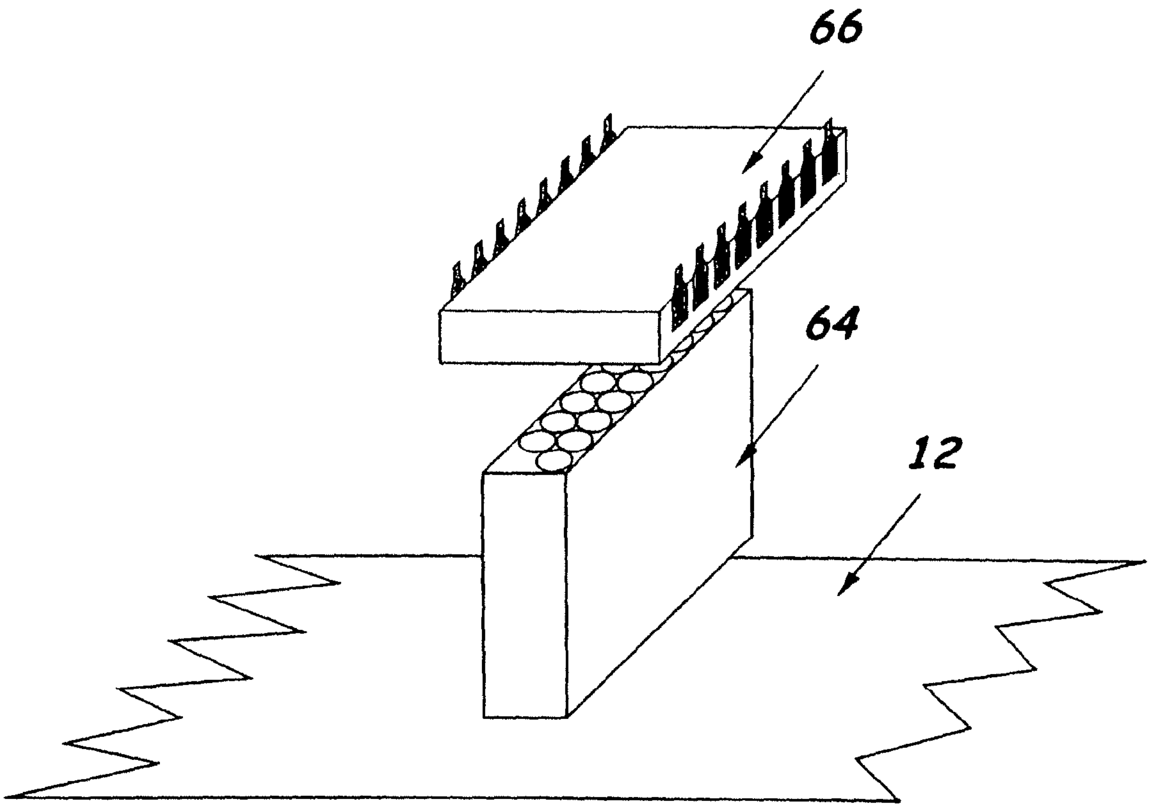
FIG. 8 is a schematic of a contact image sensor and GRIN lens array.

In the preferred embodiment, the lens array 64 is a gradient index (GRIN) lens array, such as a SELFOC brand lens array, available from NSG Europe, as illustrated in FIG. 8. This lens array has one or more rows of gradient index lenses, with each lens having a continuous change of refractive index inside a cylinder. The lenses couple light reflected from the imprinted web to a plurality of sensing elements of a contact image sensor 66. The images from adjacent lenses overlap and form a continuous image adjacent the contact image sensor 66. The array provides a one to one correspondence between the width of an image sensing region and the width W (illustrated in FIG. 7) of a single sensing element 67. In other words, each sensing element 67 measures light reflected by a corresponding image region on the web, wherein a width of each sensing element is substantially equal to a width of the corresponding image region measured in the lateral direction. If the bottom of lens array 64 is at a distance D1 from the web 12, then the distance between the top of the lens array and the contact image sensor 66 is substantially equal to distance D1. In a preferred embodiment, D1 is approximately ¼ inch (a typical idler roller has a diameter of approximately four to six inches). The lens array has a height (measured radially outwardly from the idler roller) of approximately ½ to ¾ inches.

The contact image sensor 66 can include a plurality of sensing elements 67, and one embodiment of the contact image sensor in the form of a sensor board with input/output (I/O) terminals is schematically illustrated in FIG. 7. In the preferred embodiment, the contact image sensor can include twenty identical image sensor chips 69 placed end to end, having a sensing length of 12.4 inches. Such sensors are known in the art and are commercially available.

Each sensor chip 69 can include four rows, denoted Mono, Red, Green and Blue, of sensing elements 67 for respectively sensing light having wavelengths within a particular range, such as white, red, blue and green light. Each row of the contact image sensor can include 7440 active sensing elements (i.e., 372 per sensor chip) and 120 dark sensing elements for reference purposes. For example, the sensing elements 67 are pn junction photodiodes fabricated using CMOS technology and have a width of 42.33 microns, which corresponds to 600 sensing elements per inch. Various other contact image sensors can be used utilizing other known sensing technologies such as CCD sensing elements. In the preferred embodiment, the contact image sensor 66 is externally configured to read out signals from the twenty sensing chips 69 in parallel. In one embodiment, the sensor chip is used in a monochromatic mode, while in another embodiment, the R, G, and B channels are used.

As stated, the image signals are acquired for one line at a time. The resolution in the longitudinal direction is determined by the web speed and a clock rate. For example, for a desired longitudinal resolution of 75 lines of image data per inch (75 pixels per inch), and a web speed of 3000 feet/min (600 inches/sec), the web will move 1/75 of an inch in 1/45,000 second. Thus, a line rate of 45 kHz is required to provide resolution of 75 pixels per inch. Each chip requires 372 clock cycles to output the image signals from each sensing element, so that a single line from all three channels requires a clock speed greater than 50.22 MHz (=45 kHz*372*3). In a preferred embodiment, a 60 MHz clock signal from the sensor interface board can be employed to clock out data from the R, G, B rows of each chip.

The sensor interface circuit 68 includes an analog front end and a digital processing circuit. In the preferred embodiment, the analog front end includes an A/D converter for converting the image signals from analog to digital. Further, the A/D converter includes a programmable gain amplifier, and the voltage value corresponding to an averaged output of two sensing elements is converted to an eight bit digital voltage signal. Thus, the lateral resolution at the output of the A/D converter corresponds to 300 pixels per inch.

The digital processing circuit 72 operates to further reduce the lateral resolution to around 75 pixels per inch. This can be accomplished by averaging every four values to produce a single value, or by simple deleting 75% of the values. The digital processing circuit also operates to adjust the digital values by an offset and gain amount. An appropriate offset and gain amount for the sensing elements can be determined by obtaining values for no light conditions, and full light conditions, as is known in the art.

The image processor processes the image data. The processing can include, for example, comparison with reference image data for ink color control, color registration, and/or defect detection purposes, or for other applications.

Various features and advantages of the invention are set forth in the following claims.

What is claimed is:

1. A method of inspecting an imprinted substrate on a printing press, comprising:
- illuminating a portion of the substrate which has been imprinted with different colors at a plurality of printing units of the printing press, each printing unit comprising a plate cylinder;
- sensing light reflected by the substrate using a contact image sensor to produce data representative of the imprinted substrate;
- comparing the data representative of the printed substrate with stored reference data.

2. The method of claim 1, wherein the substrate is imprinted with a graphical/textual image.

3. The method of claim 1, further comprising detecting color registration based on the comparing.

4. The method of claim 1, wherein the substrate is a web.

5. The method of claim 1, further comprising refracting the light reflected by the substrate with a continuous index of refraction.

6. The method of claim 1, wherein the contact image sensor comprises a plurality of sensing elements, wherein a dimension of each sensing element is substantially equal to a dimension of a corresponding region of the substrate imaged by the sensing element.

7. The method of claim 1, wherein the method inspects a newspaper substrate on a newspaper press.

8. The method of claim 1, further comprising identifying a defect on the imprinted substrate based on the comparing.

9. The method of claim 2, further comprising identifying an ink color error based on the comparing.

10. The method of claim 9, further comprising generating ink key control signals based on the ink color error.

11. A method for inspecting an imprinted substrate on a printing press, comprising:
- illuminating a portion of the substrate which has been imprinted with an image at a printing unit of the printing press, the printing unit comprising a plate cylinder;
- sensing light reflected by the imprinted substrate with a plurality of sensing elements, wherein each sensing element senses light reflected by a corresponding region on the substrate to produce data representative of the corresponding region printed on the substrate, wherein a dimension of each sensing element is substantially equal to a dimension of the corresponding region printed on the substrate; and
- comparing the data representative of the corresponding region printed on the substrate with stored reference data.

12. The method of claim 11, wherein the dimensions of the sensing elements and corresponding regions is a width.

13. The method of claim 11, wherein the sensed region of the substrate comprises a graphical/textual printed work.

14. The method of claim 11, further comprising detecting color registration based on the comparing.

15. The method of claim 11, wherein the sensed region of the substrate comprises color patches printed separate from other portions of a desired graphical/textual printed work, further comprising detecting an ink color error based on the comparing.

16. The method of claim 11, wherein the substrate comprises a web.

17. The method of claim 11, further comprising refracting light between the substrate and the sensing elements with a continuous index of refraction.

18. The method of claim 11, wherein the method inspects a newspaper substrate on a newspaper press.

19. The method of claim 11, wherein the substrate has been imprinted with different colors at a plurality of printing units of the printing press.

20. The method of claim 13, further comprising identifying an ink color error based on the comparing and generating ink key control signals based on the ink color error.

21. The method of claim 13, further comprising identifying a defect in the graphical/textual printed work based on the comparing.

* * * * *